United States Patent [19]

Haegert

[11] Patent Number: 4,750,772
[45] Date of Patent: Jun. 14, 1988

[54] AERODYNAMIC STRUCTURE FOR SEMI-TRAILER TRUCKS

[75] Inventor: Fritz W. Haegert, Larwill, Ind.

[73] Assignee: Navistar International Transportation Corp., Chicago, Ill.

[21] Appl. No.: 777,070

[22] Filed: Sep. 17, 1985

[51] Int. Cl.⁴ ............................................. B62D 35/00
[52] U.S. Cl. ......................................................... 296/1 S
[58] Field of Search .................... 296/1 S, 206, 91; 105/2 R; 244/130, 131

[56] References Cited

U.S. PATENT DOCUMENTS

| | | |
|---|---|---|
| 3,711,146 | 1/1973 | Madzsar et al. .................. 296/1 S |
| 3,972,556 | 8/1976 | Mason, Jr. ........................ 296/1 S |
| 4,245,862 | 1/1981 | Buckley, Jr. ..................... 296/1 S |
| 4,257,641 | 3/1981 | Keedy ................................. 296/91 |
| 4,257,643 | 3/1981 | Choulet ............................ 296/1 S |
| 4,293,159 | 10/1981 | Bott .................................. 296/91 |
| 4,379,582 | 4/1983 | Miwa ................................. 296/91 |
| 4,397,496 | 8/1983 | Drygas, III ....................... 296/1 S |

OTHER PUBLICATIONS

Ward's Auto World, May 1884, p. 38H.

Primary Examiner—Robert R. Song
Attorney, Agent, or Firm—F. David Aubuchon; Dennis K. Sullivan

[57] ABSTRACT

A highway tractor cab is provided with a rigid aerodynamic structure, which may also be on the cab roof, which extends the sides of the cab and/or roof deflector beyond the rear wall of the cab toward a semi-trailer articulatedly connected to the tractor. A flexible side extension member, which is deformable on contact with the trailer but has a high degree of shape retention in the absence of such contact, is attached to the rear edge of the rigid structure and has an outer surface disposed to form an aerodynamically efficient continuation of the outer surface of the rigid structure. Preferably, the flexible side extension is wedge-shaped and is attached by a T-in-slot connection to a slotted tube mounted to the rigid structure completely inwardly of the outer surface thereof to avoid disturbing the air stream passing therealong.

10 Claims, 1 Drawing Sheet

AERODYNAMIC STRUCTURE FOR SEMI-TRAILER TRUCKS

BACKGROUND OF THE INVENTION

This invention is related to aerodynamic structures of the type to reduce the overall drag of the tractor-trailer trucks to reduce the overall drag of the tractor-trailer combination and, more particularly, to a flexible extension for the aerodynamic structure to minimize the damage caused by impact of the aerodynamic structure with the semi-trailer while maintaining the aerodynamic efficiency of the overall structure.

THE PRIOR ART

It is well known to provide aerodynamic structures on semi-trailer trucks for improving the aerodynamic efficiency of the overall combination. Such structures are shown on the tractor cab roof in Mason, Jr. U.S. Pat. No. 3,972,556 and Buckley, Jr. U.S. Pat. No. 4,245,862. It is also well known to close the gap entirely. Such is shown, for example, in Madzsar et al. U.S. Pat. No. 3,711,146, which incidentally teaches a rubber extension section which contacts the trailer when the gap is closed. However, to accommodate tractor-trailer articulation, the Madzsar structure is necessarily complex and expensive and might create safety problems if used on the highway. Similarly, it is known to extend the sides of the cab rearwardly toward the trailer to minimize the gap between the tractor and trailer while providing clearance for the trailer to articulate relative to the tractor. Such side extensions are shown, for example, on certain models of the 9670 Series truck tractors manufactured by International Harvester Company since 1981.

It is clear that fixed rigid side extensions which allow room for the truck to articulate while closing the gap between cab and trailer as much as possible are preferable from the standpoint of simplicity and providing an unvarying surface to withstand the wind forces and thereby provide an aerodynamically efficient transfer of the air stream from the side of the cab to the trailer sides. There are, however, certain tractor-trailer maneuvers where the articulation is extreme and which would either cause damage to fixed rigid side or roof extensions or result in much shorter and therefor less aerodynamically desirable extensions if the extremes of articulation are to be accounted for.

SUMMARY OF INVENTION

Accordingly, it is an object of the present invention to provide an aerodynamic structure for a highway tractor which will minimize damage thereto caused by contact with the trailer during extreme articulation while maintaining aerodynamically efficient transfer of the air stream from the cab to the trailer.

In accordance with the invention, a highway tractor cab is provided with a rigid aerodynamic structure, which may also be on the cab roof, which extends the sides of the cab and/or roof deflector beyond the rear wall of the cab toward a semi-trailer articulatedly connected to the tractor. A flexible side extension member, which is deformable on contact with the trailer but has a high degree of shape retention in the absence of such contact, is attached to the rear edge of the rigid structure and has an outer surface disposed to form an aerodynamically efficient continuation of the outer surface of the rigid structure. Preferably, the flexible side extension is wedge-shaped and is attached by a T-in-slot connection to a slotted tube mounted to the rigid structure completely inwardly of the outer surface thereof to avoid disturbing the air stream passing therealong.

DESCRIPTION OF THE DRAWINGS

Other objects and advantages of the invention will become more apparent upon perusing the detailed description thereof and upon reference to the drawings in which.

DESCRIPTION OF THE PREFERRED EMBODIMENT

Figure 1:
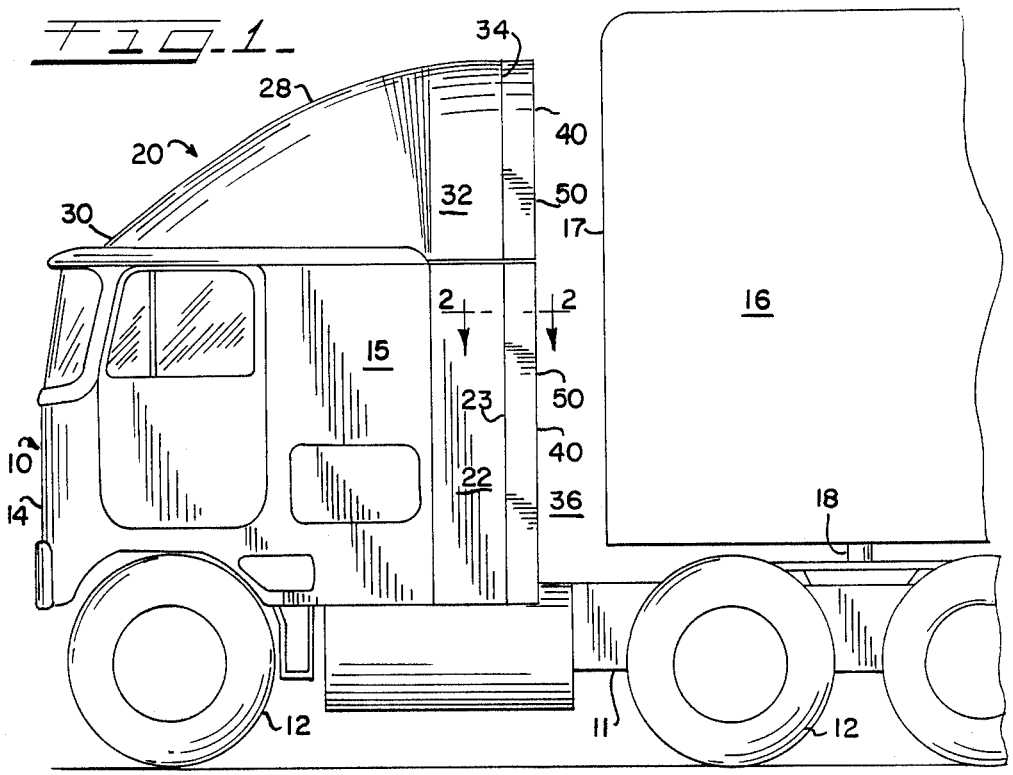
FIG. 1 is side view of the forward portion of a highway tractor-trailer combination incorporating the present invention.

Referring to the drawings, there is shown a highway truck comprising a tractor 10 comprising a mobile chassis or frame 11 mounted on wheels 12. Forwardly on the frame 11 an operator's cab 14, in this case, a cab-over model, is mounted over the engine (not shown). Rearwardly on the frame 11 a semi-trailer 16 is articulatedly mounted as about pivot 18 forming a part of a conventional fifth wheel assembly.

A rigid aerodynamic structure 20 is mounted to the roof and rear portion of cab 14 and comprises rigid side extension members 22 (only the left side being illustrated) which may be sheet metal or fiberglass panels attached to the rear of the tractor cab and having an outer surface 24 disposed to form an aerodynamically efficient continuation of the outer surface of the side panel 15 of the cab and extends upwardly from the base of the cab to just below the roof line thereof. The side extensions 22 conventionally have very little thickness relative to the width of the tractor cab except for stiffening members such as 26 thereon so that the space rearwardly of the cab but between the respective left and right rigid side extensions 22 can receive the forward corners of the trailer 16 during normal articulation of the vehicle.

A conventional rigid wind deflector 28 made of fiberglass is disposed on the roof of cab 14 and extends from a relatively narrow front end 30 adjacent the cab roof diverging rearwardly left and right to rear outside panel portions 32 (only the left being illustrated) which are vertically aligned with the side extension members 22. The rear edges 34 of the rearward outside portions 32 of the roof deflector 28 are aligned with the rear edges 23 of the side extension members 22. The foregoing has been a description of a conventional tractor trailer combination having a rigid aerodynamic structure for reducing tractor-trailer drag. These structures are designed to cause the airstream passing along the sides 15 of the cab to transfer smoothly to the side extension panels 22 and to then jump the gap 36 between tractor and trailer and reattach smoothly to the sides of the trailer 16. Similarly, the roof deflector 28 is intended to smoothly deflect air encountering the tractor upwardly and across the gap 36 and on to the top of the trailer 16.

Figure 2:
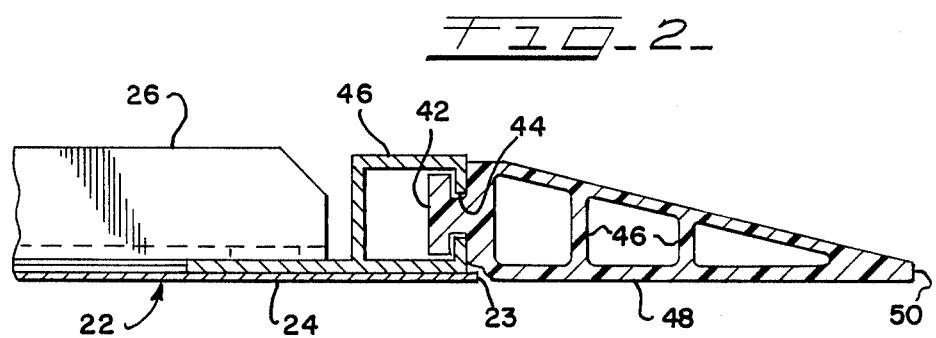
FIG. 2 is an enlarged horizontal section of a portion of the aerodynamic structure of the tractor of FIG. 1, taken along the line 2—2 thereof.

In accordance with the invention, flexible side extension members 40 are attached respectively along the rear edges 23 and 34 of the rigid side extension members 22 and roof deflector 28. More particularly, as shown in FIG. 2, the side extension members 40 comprises a wedge-shaped elastomeric body having a T-shaped forward edge portion 42 which is slidingly received in a rearwardly facing slot 44 of tubular bracket member 46, the latter being attached to the rigid side extension members 22 and deflector portions 32 and running vertically adjacent their rearward edges. The flexible extension members 40 may be molded or extruded from a variety of elastomeric products and are preferably cored or hollow for weight reduction purposes. Nevertheless, a high degree of shape retention is required in the flexible extensions 40 and to that end vertical ribs 46 extending laterally of the wedge section are provided. It will be seen that the laterally outer surface 48 of the side extension member 40 forms an aerodynamically efficient continuation of the outer surface 24 of the rigid side extension member (or the surface of the deflector 28) and extends to a distal edge 50 which is disposed substantially forward of the forward wall 17 of trailer 16. A high degree of shape retention is that required to maintain the alignment of surfaces 24 and 48 when subjected to the turbulent air forces which would be encountered in highway truck operations near the gap between the tractor and the trailer. Deflection of the surface 48 inwardly from the surface 24 would result in the airstream passing along those surfaces impinging on the front end of the trailer and increasing the drag of the tractor-trailer combination. Rounding the distal edge 50 would have a similar effect. Thus, such inward deflection must be avoided in that design of the flexible side extension members 40 to the greatest extent possible consistent with their being deformable upon contact with the trailer.

In operation, normal articulation of the trailer 16 relative to the tractor 10, as in making a turn at an intersection, will result in the forward corners of the trailer 16 passing the rigid aerodynamic structure and the flexible extension members 40 and going behind the center portion of the cab 14 of the tractor. However, in extreme articulation conditions, such as maneuvering the trailer in tight quarters up to a loading dock, the tractor may be articulated more than 90° resulting in a flexible extension member 40 contacting the side of the trailer 16. Should this happen, the flexible side extension member will deform to accommodate the interference. Upon straightening of the tractor relative to the trailer, the side extention will resume its previous shape and again provide an aerodynamically efficient transfer of airstreams passing therealong onto the side of the trailer.

What is claimed is:

1. In combination with a highway tractor of the type having a mobile frame, an operator's cab mounted forwardly on said frame in the direction of travel, and a vertical pivotal coupling means disposed on said frame rearwardly of said cab and adapted to mount a trailer to said frame, an aerodynamic structure disposed between the cab and coupling means and adapted to transfer airflow from along the tractor sides to the trailer sides comprising:

a rigid unitary side extension member attached in fixed position to said cab and having a forward edge disposed adjacent the rear corner of a side of said cab over a substantial portion of the height of said cab and extending to a rearward edge, the outer surface of said extension member relative to the fore-and-aft center line of said tractor forming an aerodynamically efficient continuation of said cab side;

a connection means mounted to said side extension member adjacent said rearward edge and substantially inward of said outer surface thereof; and a flexible material side extension member attached to said connection means and extending rearwardly therefrom to an unsupported distal end which does not contact said trailer during normal articulation at highway speeds of said trailer relative to said tractor, said flexible material extension being a continuation of said rigid side extension which is aerodynamically efficient at highway speeds, said flexible material side extension being deformable in compression in the fore-and-aft direction upon contact with said trailer during extreme articulation thereof relative to said tractor and being inflexible in transverse bending.

2. The invention in accordance with claim 1 and said cab having an aerodynamic roof deflector attached thereto and extending rearwardly of the cab to a generally vertical rearward edge disposed adjacently above said rigid side extension member, a connection means attached to said deflector adjacent said rearward deflector edge, and a flexible material deflector extension member, deformable upon contact with said semi-trailer, having a high degree of shape retention in the absence of such contact, and being relatively inflexible in transverse bending extending rearwardly of said deflector to a distal end, said flexible material deflector extension member forming an aerodynamically efficient continuation of the exterior surface of said deflector.

3. The invention in accordance with claim 2 and said flexible material side and roof fairing extension members being disposed adjacent both sides of said cab.

4. The invention in accordance with claim 1 and said flexible material extension members being of wedge-shaped cross section narrowing to said distal end.

5. The invention in accordance with claim 1 and said connection means comprising a slotted tube attached to said rigid side extension with a vertical slot facing rearwardly and said flexible material extension member comprising a T-shaped cross section at its forward end having its cross bar disposed within said tube, the outer surface of said flexible material extension member forming an aerodynamically efficient continuation of the outer surface of said rigid side extension.

6. In a highway tractor of the type having an operator's cab and adapted to pull a trailer articulatedly connected thereto behind said cab, said tractor cab having a rigid aerodynamic structure disposed above the roof of said cab and extending from a forward portion of said cab roof upwardly and rearwardly therefrom to generally vertical left and right laterally spaced rear edges disposed rearwardly of said cab roof, said aerodynamic structure being disposed to aerodynamically facilitate air flow streams leaving the tractor to reattach to the sides of the trailer, the improvement wherein flexible material side extension members are attached respectively along said rear edges of said aerodynamic structure and extend rearwardly to unsupported distal ends which do not contact said trailer during normal articulation at highway speeds of said trailer relative to said tractor, said flexible material side extension members having a sufficient degree of shape retention to be inflexible in transverse bending in the presence of the aerodynamic forces occurring in highway applications and being deformable in compression in the fore-and-aft direction upon contact with said trailer, said flexible material extension members forming an aerodynamically efficient continuation at highway speeds of said aerodynamic structure.

7. The invention in accordance with claim 6 and said aerodynamic structure further including rigid rearward extensions of the respective sides of said cab and flexible material side extension members also being attached respectively thereto.

8. The invention in accordance with claim 6 and connection means disposed in connecting relation between said rigid aerodynamic structure and said flexible material side extension members, said connection means being completely out of the airstream passing along the outer surfaces of said rigid structure and said flexible material side extension members.

9. The invention in accordance with claim 4 and said wedge-shaped cross section including an inner medial stiffening rib disposed transversely of the exterior surface of said extension member.

10. The invention in accordance with claim 6 and said flexible material extension members having a hollow wedge-shaped cross section tapering to said distal end, and a stiffening rib disposed within said hollow cross section and extending transversely to said outer surface.

* * * * *